United States Patent
Yu (10) Patent No.: US 11,661,064 B2
(45) Date of Patent: May 30, 2023

(54) TRAVEL CONTROL APPARATUS AND TRAVEL CONTROL METHOD

(71) Applicant: Honda Motor Co., Ltd., Tokyo (JP)

(72) Inventor: Kaijiang Yu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 143 days.

(21) Appl. No.: 17/174,309

(22) Filed: Feb. 11, 2021

(65) Prior Publication Data
US 2022/0250622 A1    Aug. 11, 2022

(51) Int. Cl.
*B60W 30/18* (2012.01)
*G05D 1/02* (2020.01)

(52) U.S. Cl.
CPC .............. *B60W 30/18163* (2013.01); *B60W 30/18154* (2013.01); *G05D 1/0214* (2013.01); *B60W 2552/53* (2020.02); *B60W 2554/801* (2020.02); *B60W 2554/802* (2020.02); *B60W 2554/803* (2020.02); *B60W 2554/804* (2020.02); *B60W 2555/60* (2020.02); *B60W 2720/106* (2013.01); *B60W 2720/125* (2013.01)

(58) Field of Classification Search
CPC ..... B60W 30/18163; B60W 30/18154; B60W 2552/53; B60W 2554/801; B60W 2554/802; B60W 2554/803; B60W 2554/804; B60W 2555/60; B60W 2720/106; B60W 2720/125; B60W 2520/04; G05D 1/0214; G08G 1/0145; G08G 1/065; G08G 1/133; G08G 1/095; A63H 18/026; B60R 1/005; B60Q 2300/116; H02G 15/25
See application file for complete search history.

(56) References Cited

U.S. PATENT DOCUMENTS

2019/0276045 A1*  9/2019  Chow ................... B60W 10/08
2021/0001856 A1*  1/2021  Miura ....................... B60T 7/12

FOREIGN PATENT DOCUMENTS

WO    2019159214 A1    8/2019

* cited by examiner

*Primary Examiner* — Peter D Nolan
*Assistant Examiner* — Ashley L Redhead, Jr.
(74) *Attorney, Agent, or Firm* — Duft & Bornsen, PC (57) ABSTRACT

A travel control apparatus is configured to control a travel of a vehicle so as to travel along a target path. The travel control apparatus is configured to perform: acquiring a change schedule information of a traffic light installed over each of a plurality of merge lanes that merge with a main line and configured to be able to change an indication form between a first indication form permitting the vehicle to merge with the main line and a second indication form instructing the vehicle to stop before a stop line; determining a merge lane on which the vehicle travels among the plurality of merge lanes, based on the change schedule information of a traffic light located in a travel direction of the vehicle; and generating a target path of the vehicle leading to the stop line of the merge lane.

7 Claims, 6 Drawing Sheets

TRAVEL CONTROL APPARATUS AND TRAVEL CONTROL METHOD

BACKGROUND OF THE INVENTION

Field of the Invention

This invention relates to a travel control apparatus performing control of the vehicle at a point at which a plurality of merge lanes merge and a travel control method of the travel control apparatus.

Description of the Related Art

As this type of apparatuses, there have been known apparatuses that assist a driver in driving a vehicle at a merge point at which multiple merge lanes merge with a main line (for example, see International Publication No. 2019/159214). International Publication No. 2019/159214 describes an apparatus that when a merge lane different from a merge lane on which the vehicle is traveling has a lower traffic volume, performs travel control of the vehicle so that the vehicle changes the lane to the different merge lane.

However, a merge traffic light (ramp meter) for controlling the amount of vehicle flow into a main line may be installed at a merge point at which multiple merge lanes merge with a main line as described above. In this case, even if driving assistance is provided on the basis of the traffic volume of each merge lane as is done by the apparatus of International Publication No. 2019/159214, it would be difficult to cause the vehicle to smoothly enter the main line depending on the timing at which the indication of the merge traffic light is changed.

SUMMARY OF THE INVENTION

An aspect of the present invention is a travel control apparatus configured to control a travel of a vehicle so as to travel along a target path, including an electronic control unit including a microprocessor and a memory connected to the microprocessor. The travel control apparatus is configured to perform: acquiring a change schedule information of a traffic light installed over each of a plurality of merge lanes that merge with a main line and configured to be able to change an indication form between a first indication form permitting the vehicle to merge with the main line and a second indication form instructing the vehicle to stop before a stop line; determining a merge lane on which the vehicle travels among the plurality of merge lanes, based on the change schedule information of a traffic light located in a travel direction of the vehicle; and generating a target path of the vehicle leading to the stop line of the merge lane.

Another aspect of the present invention is travel control method of a travel control apparatus configured to control a travel of a vehicle so as to travel along the target path. The travel control method includes: acquiring a change schedule information of a traffic light installed over each of a plurality of merge lanes that merge with a main line and configured to be able to change an indication form between a first indication form permitting the vehicle to merge with the main line and a second indication form instructing the vehicle to stop before a stop line; determining a merge lane on which the vehicle travels among the plurality of merge lanes, based on the change schedule information of a traffic light located in a travel direction of the vehicle; and generating a target path of the vehicle leading to the stop line of the merge lane.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereafter, an embodiment of the present invention is explained with reference to FIGS. 1 to 5B. A vehicle control system according to an embodiment of the present invention can be applied to vehicles having a driving support function or autonomous driving function. Hereafter, an example will be described in which a travel control apparatus according to the present embodiment is applied to a vehicle having an autonomous driving function (autonomous driving vehicle). Note that a vehicle to which the travel control apparatus according to the present embodiment is applied may be referred to as the "subject vehicle" to distinguish the vehicle from other vehicles. The subject vehicle is able not only to travel in autonomous driving mode, in which the driver does not have to drive the vehicle, but also to travel in manual driving mode, in which the driver drives the vehicle.

Figure 1:
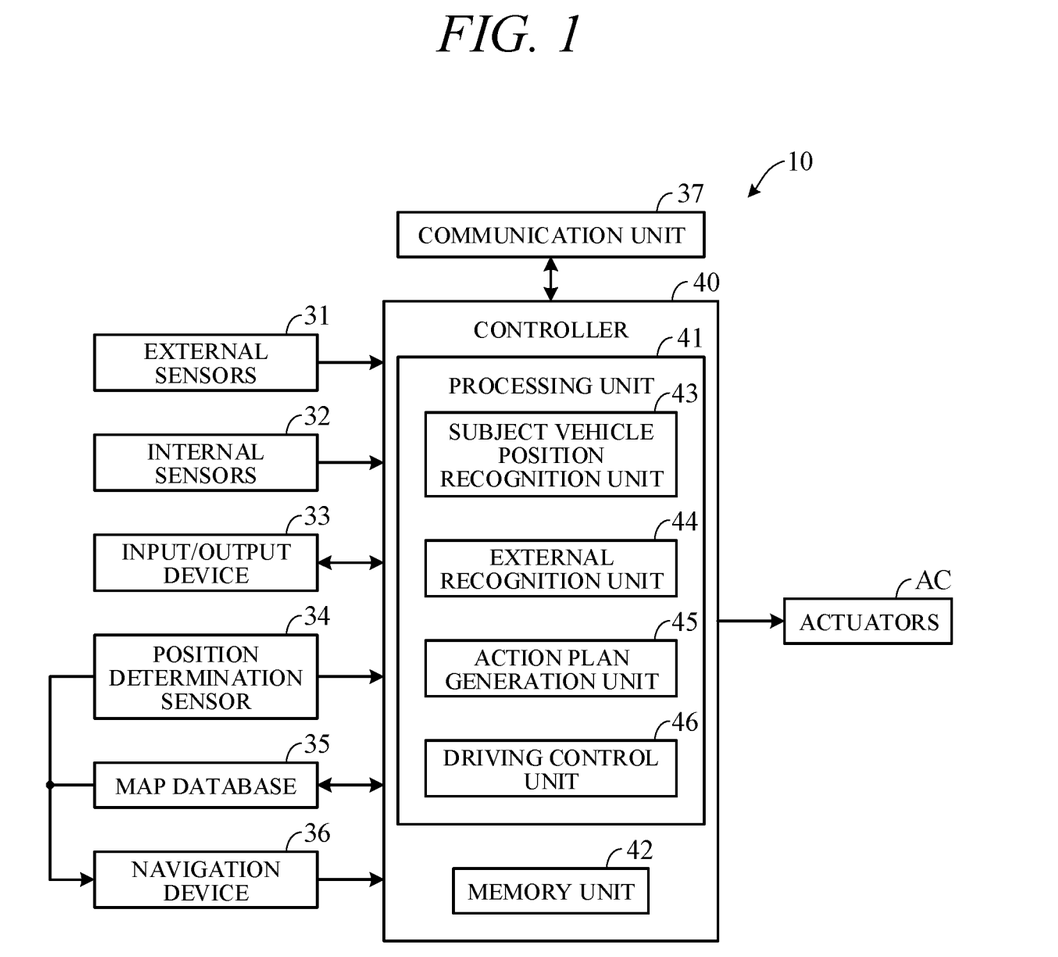
FIG. 1 is a block diagram schematically showing the overall configuration of a vehicle control system according to an embodiment of the present invention.

FIG. 1 is a block diagram schematically showing the overall configuration of a vehicle control system (vehicle control apparatus) 10 according to the present embodiment. As shown in FIG. 1, the vehicle control apparatus 10 mainly includes a controller 40, external sensors 31 electrically connected to the controller 40, internal sensors 32, an input/output device 33, a position determination sensor 34, a map database 35, a navigation device 36, a communication unit 37, and travel actuators (hereafter simply referred to as the "actuators") AC.

The external sensors 31 are multiple sensors that detect the external circumstances, which are information on the surroundings of the subject vehicle. For example, the external sensors 31 include a lidar that measures the distance from the subject vehicle to an obstacle around the subject vehicle by measuring scattered light corresponding to light radiated in all directions of the subject vehicle and a radar that detects other vehicles, obstacles, or the like around the subject vehicle by emitting electro-magnetic waves and detecting the reflected waves. The external sensors 31 also include, for example, a camera that is mounted on the subject vehicle, includes an image sensor, such as a CCD or CMOS, and captures images of views around (ahead of, behind, and on the sides of) the subject vehicle, a microphone (hereafter simply referred to as the "mike") that receives sound signals from around the subject vehicle, and the like. The external sensors 31 transmit detected and received signals to the controller 40.

The internal sensors 32 are multiple sensors that detect the travel state or internal state of the subject vehicle. For example, the internal sensors 32 include a vehicle speed sensor that detects the speed of the subject vehicle, an acceleration sensor that detects the acceleration in the front-rear direction and the acceleration in the left-right direction (lateral acceleration) of the subject vehicle, a RPM sensor that detects the RPM of the travel drive source, a yaw rate sensor that detects the rotational angular velocity around the vertical axis of the center of gravity of the subject vehicle, and the like. The internal sensors 32 also include a sensor that detects driving operations performed by the driver in manual driving mode, such as an operation of the acceleration pedal, an operation of the brake pedal, and an operation of the steering wheel. The internal sensors 32 transmit detected signals to the controller 40.

The input/output device 33 is the generic name of devices that receive commands from the driver or output information to the driver. For example, the input/output device 33 includes switches that allows the driver to input commands by operating an operation member, a mike through which the driver inputs commands as speeches, a display unit that provides information to the driver as display images, a speaker that provides information to the driver as speeches, and the like. The switches include a manual/autonomous selector switch (SW) used to make a command to perform one of autonomous driving mode and manual driving mode.

For example, the manual/autonomous selector switch is formed as a switch manually operable by the driver and, when operated, outputs a command to change the mode to autonomous driving mode, in which the autonomous driving function is enabled, or manual driving mode, in which the autonomous driving function is disabled. Upon establishment of a predetermined travel condition, the manual/autonomous selector switch may output a command to change the mode from manual driving mode to autonomous driving mode or from autonomous driving mode to manual driving mode, whether the switch is operated. That is, the manual/autonomous selector switch may change the mode automatically rather than on the basis of a manual operation.

For example, the position determination sensor 34 is a GPS sensor, receives position signals transmitted from a GPS satellite, and determines the absolute position (latitude, longitude, etc.) of the subject vehicle on the basis of the received signals. Examples of the position determination sensor 34 include not only GPS sensors but also sensors that determine the position using radio waves transmitted from a quasi-zenith orbit satellite. The position determination sensor 34 transmits a signal (a signal indicating the measurement result) to the controller 40.

The map database 35 is a device for storing typical map information used by the navigation device 36 and consists of, for example, a hard disk. The map information includes information on the locations of roads, information on the shapes (curvatures, etc.) of the roads, and information on the locations of intersections or bifurcation points. Note that the map information stored in the map database 35 differs from high-precision map information stored in a memory unit 42 of the controller 40.

The navigation device 36 is a device that searches for a target route on a road leading to the destination inputted by the driver and guides the driver along the target route. The driver inputs the destination through the input/output device 33, and the navigation device 36 guides the driver along the target route therethrough. The target route is calculated on the basis of the current position of the subject vehicle measured by the position determination sensor 34 and map information stored in the map database 35.

The communication unit 37 communicates with servers (not shown) through a network including a wireless communication network, such as the Internet line. The communication unit 37 acquires map information, traffic information, and the like from the servers periodically or at any timing and outputs the acquired map information to the map database 35 or memory unit 42. Thus, the map information is updated. The acquired traffic information includes congestion information and traffic light information, such as the time left before the traffic light changes from red to green.

The actuators AC are devices for activating devices related to travel operations of the subject vehicle. The actuators AC include a brake actuator that activates a brake device, a steering actuator that activates a steering device, and the like. The actuators AC are travel actuators for controlling the travel of the subject vehicle. If the travel drive source is an engine, the actuators AC include a throttle actuator that controls the opening of the throttle valve (throttle opening) of the engine. If the travel drive source is a travel motor, the actuators AC include the travel motor. The actuators AC also include a brake actuator that activates the brake device of the subject vehicle and a steering actuator that activates a steering device.

The controller 40 consists of an electronic control unit (ECU). While multiple ECUs having different functions, such as an engine control ECU and a transmission control ECU, may be disposed separately, the controller 40 is shown as the aggregate of such ECUs in FIG. 1 for convenience. The controller 40 includes a computer including a processing unit 41, such as a CPU (microprocessor), a memory unit 42, such as a ROM, RAM, or hard disk, and other peripheral circuits (not shown).

The memory unit 42 stores high-precision, detailed map information, including information on the central positions of lanes and information on the boundaries of the lane positions. More specifically, the memory unit 42 stores, as map information, road information, traffic regulation information, address information, facility information, phone number information, and the like. The road information includes information indicating the types of roads, such as highway, toll road, and national road, and information, such as the numbers of lanes of the roads, the widths of the lanes, the gradients of the roads, the three-dimensional coordinate positions of the roads, the curvatures of the curves of the lanes, the locations of the merge points and bifurcation points of the lanes, traffic signs, and whether a road sign or median strip is present. The traffic regulation information includes such as information indicating that travel on the lane is restricted or the lane is closed due to a construction or the like. The memory unit 42 also stores information, such as a shift map serving as the reference of gear shift operations (gear shift diagram), control programs, and thresholds used in the programs.

The processing unit 41 includes, as functional elements related to autonomous travel, a subject vehicle position recognition unit 43, an external recognition unit 44, an action plan generation unit 45, and a driving control unit 46.

The subject vehicle position recognition unit 43 recognizes the position of the subject vehicle (subject vehicle position) on a map on the basis of information on the position of the subject vehicle received by the position determination sensor 34 and map information in the map database 35. Note that the subject vehicle position recognition unit 43 may recognize the subject vehicle position using map information (information such as the shapes of buildings) stored in the memory unit 42 and information on the surroundings of the subject vehicle detected by the external sensors 31 and thus is able to recognize the subject vehicle position with high accuracy. For example, the subject vehicle position recognition unit 43 may recognize the subject vehicle position using map information stored in the memory unit 42 and data on images of the surroundings of the subject vehicle captured by the camera among the external sensors 31. Also, if a sensor installed on or on the side of a road is able to determine the subject vehicle position, the subject vehicle position recognition unit 43 may recognize the subject vehicle position with high accuracy by communicating with that sensor through the communication unit 37.

The external recognition unit 44 recognizes the external circumstances around the subject vehicle on the basis of signals from the external sensors 31, such as the lidar, radar, and camera. The external recognition unit 44 recognizes, for example, the positions, speeds, or accelerations of nearby vehicles traveling around the subject vehicle (vehicle ahead, vehicle behind), the positions of nearby vehicles stopped or parked around the subject vehicle, the positions or states of other objects, and the like. The other objects include signs, traffic lights, the boundaries or stop lines of roads, buildings, guardrails, utility poles, signboards, pedestrians, bicycles, and the like. The states of the other objects include the colors (red, green, yellow) of the traffic lights, the moving speeds or directions of the pedestrians or bicycles, and the like.

The action plan generation unit 45 generates the travel path (target path) of the subject vehicle in the period from the current time point until a predetermined time later on the basis of, for example, the target route calculated by the navigation device 36, the subject vehicle position recognized by the subject vehicle position recognition unit 43, and the external circumstances recognized by the external recognition unit 44. If multiple paths serving as candidate target paths are present on the target route, the action plan generation unit 45 selects the most suitable path satisfying criteria, such as the compliance of applicable laws and regulations and efficient and safe travel, from among the paths and determines the selected path as the target path. The action plan generation unit 45 then generates an action plan corresponding to the generated target path.

The action plan includes travel plan data set for each unit time $\Delta t$ (e.g., 0.1 s) in the period from the current time point until the predetermined time T (e.g., 5 s) later, that is, travel plan data set so as to be associated with a time of day corresponding to each unit time $\Delta t$. Travel plan data includes data on the position of the subject vehicle and data on the vehicle state set for each unit time. For example, data on the position is data on the target point indicating a two-dimensional coordinate position on a road, and data on the vehicle state includes vehicle speed data indicating the vehicle speed, direction data indicating the direction of the subject vehicle, and the like. The travel plan is updated every unit time.

The action plan generation unit 45 generates the target path by connecting the pieces of position data corresponding to the respective unit times $\Delta t$ in the period from the current time point until the predetermined time T later in the ascending order of the time of day. At this time, the action plan generation unit 45 calculates accelerations (target accelerations) corresponding to the respective unit times $\Delta$ on the basis of the vehicle speeds (target vehicle speeds) at target points corresponding to the respective unit times $\Delta t$ on the target path. That is, the action plan generation unit 45 calculates the target vehicle speeds and target accelerations. Note that the driving control unit 46 may calculate the target accelerations.

To generate the target path, the action plan generation unit 45 first determines the drive mode. Specifically, the action plan generation unit 45 determines the drive mode from follow mode, in which the subject vehicle is following a vehicle ahead, passing mode, in which the subject vehicle is passing a vehicle ahead, lane change mode, in which the subject vehicle is changing the travel lane, merge mode, in which the subject vehicle is merging with the main line of a highway or toll road, keeping-lane mode, in which the subject vehicle is keeping the travel lane so as not to depart from the lane, constant speed mode, deceleration mode, acceleration mode, and the like. The action plan generation unit 45 then generates the target path on the basis of the drive mode.

In autonomous driving mode, the driving control unit 46 controls the actuators AC so that the subject vehicle travels along the target path generated by the action plan generation unit 45. That is, the driving control unit 46 controls the throttle actuator, transmission actuator, brake actuator, steering actuator, and the like so that the subject vehicle passes the target points P corresponding to the respective unit times.

More specifically, the driving control unit 46 calculates the required driving force for obtaining the target accelerations corresponding to the respective unit times calculated by the action plan generation unit 45 considering the travel resistance determined by the road gradient or the like in autonomous driving mode. The driving control unit 46 then feedback controls the actuators AC, for example, so that the actual accelerations detected by the internal sensors 32 become the target accelerations. That is, the driving control unit 46 controls the actuators AC so that the subject vehicle travels at the target vehicle speeds and target accelerations. Note that in manual driving mode, the driving control unit 46 controls the actuators AC in accordance with travel commands (accelerator opening, etc.) from the driver acquired by the internal sensors 32.

Figure 2A:
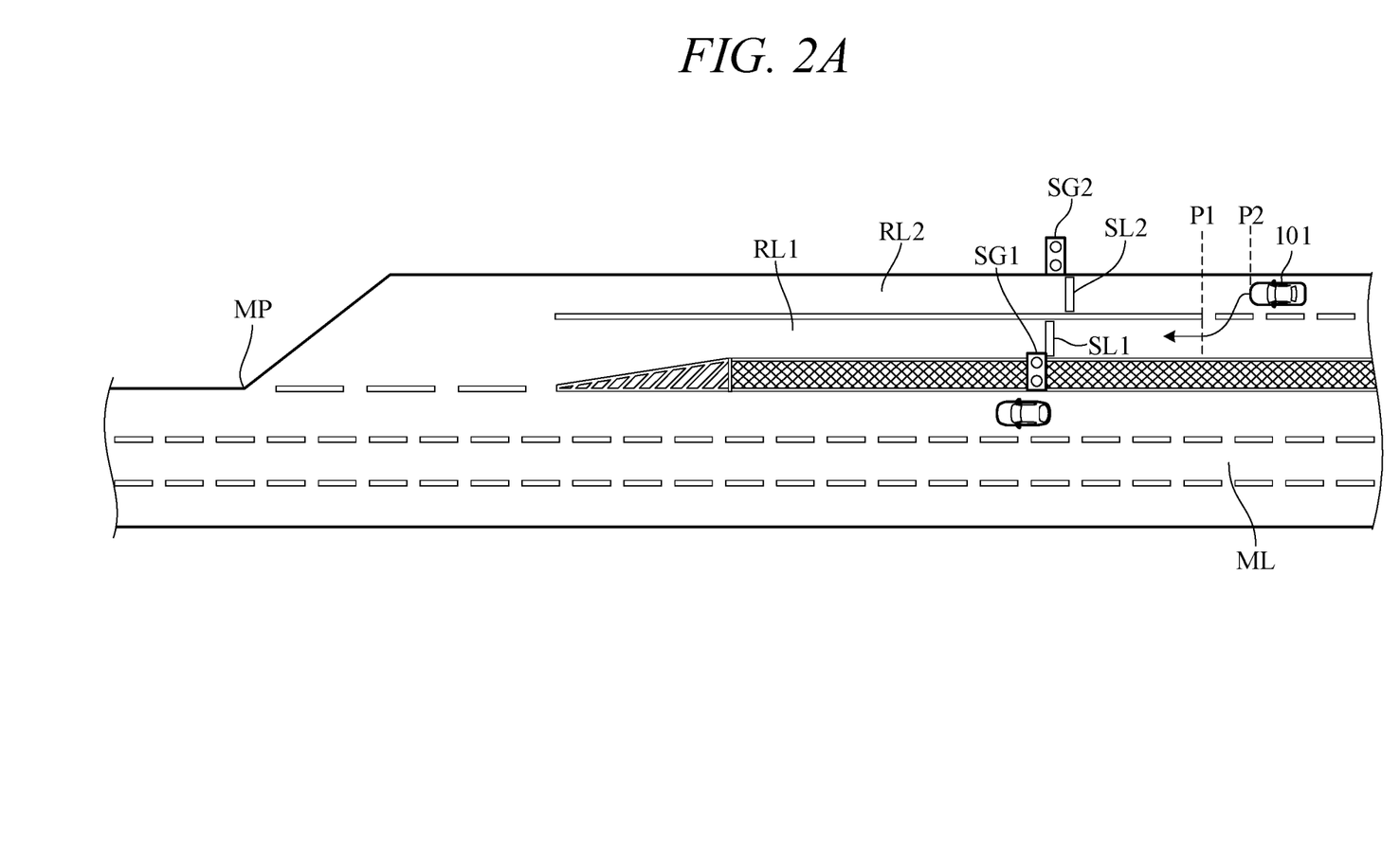
FIG. 2A is a diagram showing an example of a merge point.

As shown in FIG. 2A, it is assumed that a subject vehicle 101 enters a main line ML at a merge point MP at which multiple merge lanes RL1 and RL2 merge with the main line ML. In this case, the travel path along which the subject vehicle travels on the merge lane RL1 closer to the main line ML (an inner merge lane with respect to the main line ML) is shorter than the travel path along which the subject vehicle travels on the merge lane RL2. Accordingly, by traveling on the merge lane RL1, the subject vehicle is able to enter the main line more smoothly, when the subject vehicle 101 is traveling on the merge lane RL2, it is preferred for the subject vehicle 101 to change the lane from the merge lane RL2 to the merge lane RL1 and then enter the main line ML. Note that the main line ML in FIG. 2A is a right-driving road with three lanes on each side.

Figure 2B:
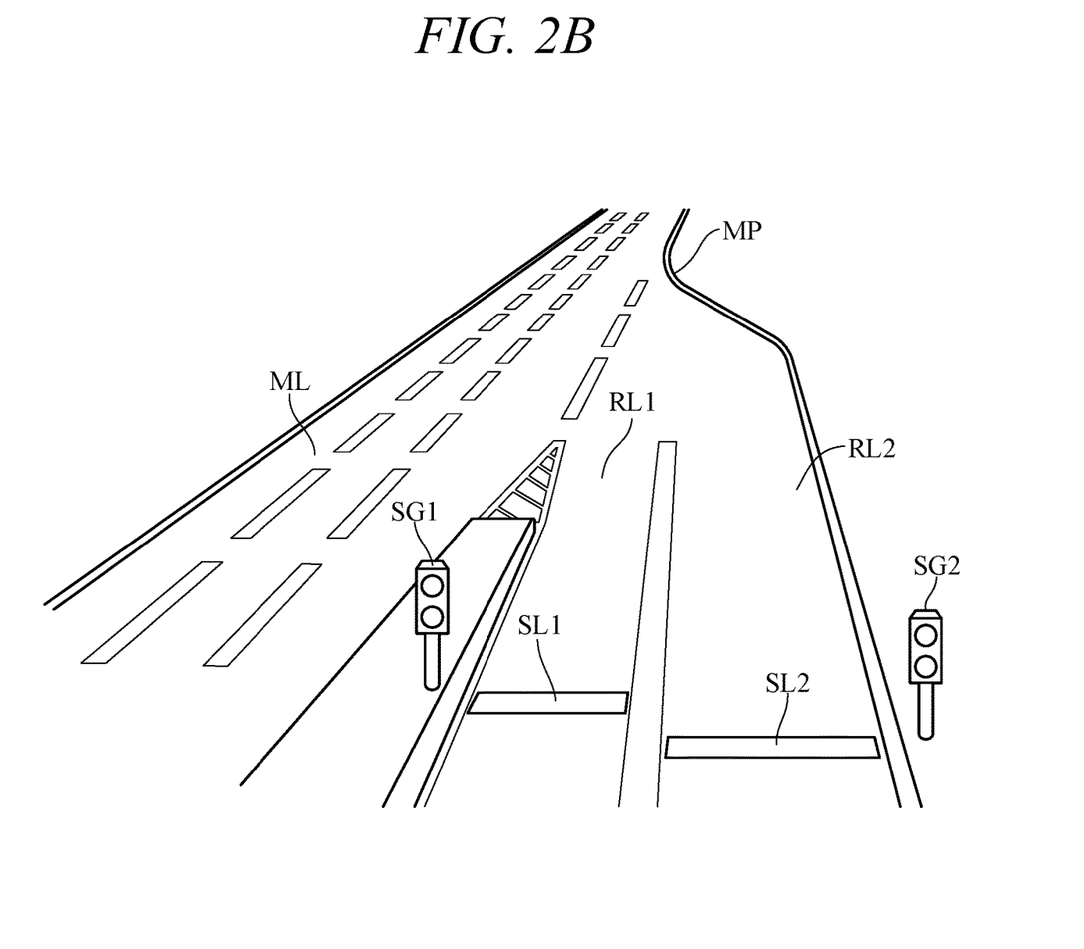
FIG. 2B is a diagram of the merge point of FIG. 2A seen from merge lane side.

However, as shown in FIG. 2A, traffic lights SG1 and SG2 may be installed over the merge lanes RL1 and RL2, respectively. The traffic lights SG1 and SG2 are merge traffic lights (ramp meters) configured to be able to change the indication form between a first indication form permitting vehicles to enter the main line ML and a second indication form instructing vehicles to stop at a stop line SL1 or SL2. FIG. 2B is a view of the merge point MP of FIG. 2A seen from the merge lanes RL1 and RL2 side. In the following description, it is assumed that the traffic lights SG1 and SG2 are merge traffic lights that include two indicators, an upper indicator that lights up in red and a lower indicator that lights up in green, and take the first indication form showing a green signal (an indication form in which the lower indicator alone lights up) and the second indication form showing a red signal (an indication form in which the upper indicator alone lights up), as shown in FIG. 2B.

When the subject vehicle 101 changes the lane from the merge lane RL2 to the merge lane RL1 and then meets the traffic light SG1 showing a red signal, it has to stop at the stop line SL1 until the traffic light SG1 shows a green signal and therefore cannot enter the main line ML smoothly. For this reason, not only the length of the travel path leading to the main line but also the timing at which the merge traffic light changes the indication form must be considered so that the subject vehicle 101 can enter the main line smoothly at the merge point where the merge traffic lights are installed. The travel control apparatus according to the present embodiment is configured as follows so that the subject vehicle 101 can enter the main line smoothly at the merge point where the merge traffic lights are installed.

Figure 3:
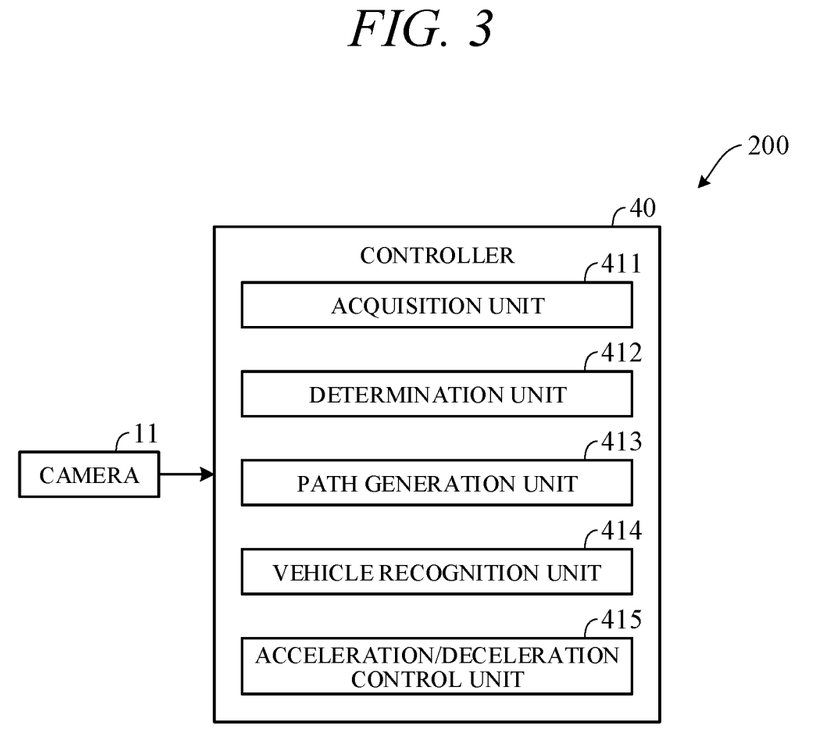
FIG. 3 is a block diagram showing a configuration of main components of a travel control apparatus according to the embodiment of the present invention.

FIG. 3 is a block diagram showing the configuration of main components of a travel control apparatus 200 according to the embodiment of the present invention. The travel control apparatus 200 forms a part of the vehicle control system 10 of FIG. 1. As shown in FIG. 3, the travel control apparatus 200 includes the controller 40. As shown in FIG. 3, the controller 40 includes, as the functional elements of the processing unit 41, an acquisition unit 411, a determination unit 412, a path generation unit 413, a vehicle recognition unit 414, and an acceleration/deceleration control unit 415. For example, the acquisition unit 411 and vehicle recognition unit 414 are configured by the external recognition unit 44 of FIG. 1. The determination unit 412 and path generation unit 413 are configured by the action plan generation unit 45. The acceleration/deceleration control unit 415 is configured by the driving control unit 46.

The acquisition unit 411 acquires information (hereafter referred to as the "change schedule information") on the change schedules of the traffic lights SG1 and SG2 of the merge lanes RL1 and RL2. More specifically, the acquisition unit 411 receives the change schedule information of the traffic lights SG1 and SG2 transmitted from a roadside unit (not shown) through the communication unit 37 using road-to-vehicle communication (V2I communication) or the like. The change schedule information includes information that allows for identification of the current indication forms of the traffic lights SG1 and SG2 or the indication form change timings. Note that the acquisition unit 411 may acquire the change schedule information of the traffic lights SG1 and SG2 on the basis of data on images of the traffic lights SG1 and SG2 captured by a camera 11. More specifically, the acquisition unit 411 may recognize the current indication forms or the indication form change timings of the traffic lights SG1 and SG2 on the basis of data on moving images of the traffic lights SG1 and SG2 captured by the camera 11 and acquire the recognized information as change schedule information.

The determination unit 412 determines one of the merge lanes RL1 and RL2 as the merge lane on which the subject vehicle 101 should travel, on the basis of the change schedule information of the traffic lights SG1 and SG2 acquired by the acquisition unit 411. Specifically, when the subject vehicle 101 reaches a position P2 a predetermined distance before the stop line SL2 of the merge lane RL2 while traveling on the merge lane RL2 more remote from the main line ML, the determination unit 412 recognizes that the traffic light SG2 of the merge lane RL2 is showing a red signal and that the remaining time of the green signal of the traffic light SG1 (the time left before the green signal is changed to a red signal) is equal to or more than a predetermined time TM, on the basis of the change schedule information of the traffic lights SG1 and SG2 and determines the merge lane RL1 as the merge lane on which the subject vehicle 101 should travel. The predetermined time TM is the time required for the subject vehicle 101 to move from the position P2 of the merge lane RL2 to the stop line SL1 while changing the lane to the merge lane RL1. Note that lane change is prohibited in predetermined sections before the stop lines SL1 and SL2 of the traffic lights SG1 and SG2 in the travel direction (sections from the position P1 to the stop lines SL1 and SL2 in FIG. 2A). Accordingly, the position P2 is set before the position P1 in the travel direction.

When the subject vehicle 101 reaches the position P2, the determination unit 412 recognizes that the traffic light SG2 of the merge lane RL2 is showing a green signal and that the remaining time of the red signal of the traffic light SG1 (the time left before the red signal is changed to a green signal) is equal to or less than the predetermined time TM on the basis of the change schedule information of the traffic lights SG1 and SG2 and determines the merge lane RL1 as the merge lane on which the subject vehicle 101 should travel.

The path generation unit 413 generates the target path of the subject vehicle 101 leading to the stop line (stop line SL1 or stop line SL2) of the merge lane (merge lane RL1 or merge lane RL2) determined by the determination unit 412. The vehicle recognition unit 414 recognizes other vehicles around the subject vehicle 101, including a vehicle traveling on the merge lane adjacent to the merge lane on which the subject vehicle 101 is traveling (hereafter referred to as the "adjacent vehicle" and the "adjacent merge lane," respectively). More specifically, the vehicle recognition unit 414 recognizes the adjacent vehicle traveling on the adjacent merge lane in the period from when the subject vehicle 101 passes the stop line SL1 or SL2 until the subject vehicle 101 enters the main line.

When the vehicle recognition unit 414 recognizes the adjacent vehicle in the period from when the subject vehicle 101 passes the stop line SL1 or SL2 until the subject vehicle 101 reaches the main line ML, the acceleration/deceleration control unit 415 controls the acceleration or deceleration of the subject vehicle 101 on the basis of the relative distance between the subject vehicle 101 and adjacent vehicle. Specifically, if the relative distance between the subject vehicle 101 and adjacent vehicle is less than a predetermined distance, the acceleration/deceleration control unit 415 determines that the subject vehicle 101 may enter the main line ML while traveling in parallel with the adjacent vehicle and causes the subject vehicle 101 to accelerate so that the subject vehicle 101 enters the main line ML earlier than the adjacent vehicle. At this time, the acceleration/deceleration control unit 415 may control the acceleration or deceleration of the subject vehicle 101 on the basis of the relative speed between the subject vehicle 101 and adjacent vehicle in addition to or in place of the relative distance therebetween. For example, even if the relative distance between the subject vehicle 101 and adjacent vehicle is less than the predetermined distance, if the relative speed of the adjacent vehicle to the subject vehicle 101 is equal to or greater than a predetermined speed, the acceleration/deceleration control unit 415 may cause the subject vehicle 101 to decelerate so that the subject vehicle 101 enters the main line ML later than the adjacent vehicle. Conversely, even if the relative distance between the subject vehicle 101 and adjacent vehicle is equal to or more than the predetermined distance, the acceleration/deceleration control unit 415 may cause the subject vehicle 101 to accelerate in accordance with the relative speed of the adjacent vehicle to the subject vehicle 101 so that the subject vehicle 101 enters the main line ML earlier than the adjacent vehicle.

Figure 4:
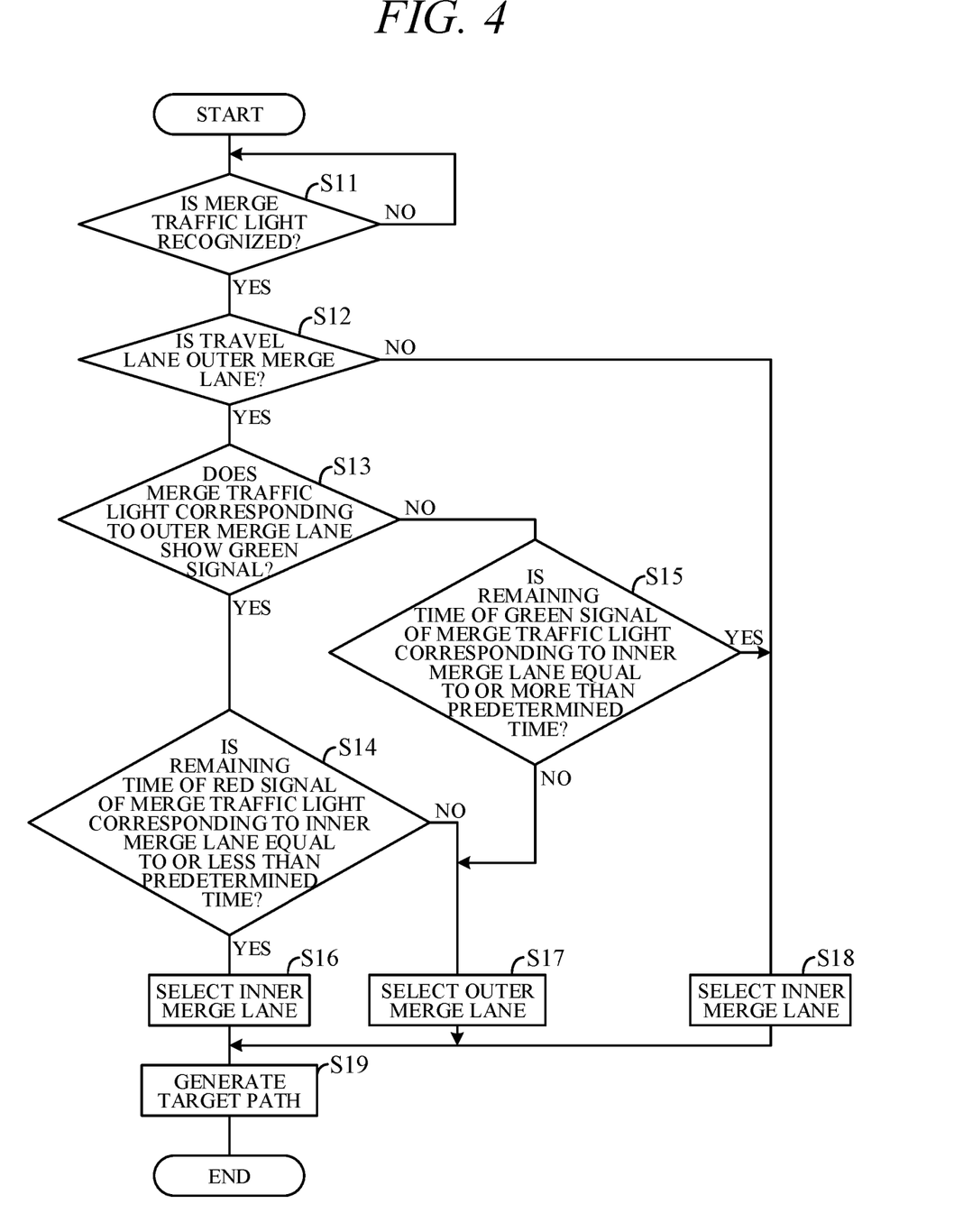
FIG. 4 is a flowchart showing an example of a process performed by a CPU of the controller of FIG. 3

FIG. 4 is a flowchart showing an example of a process performed by the controller 40 of FIG. 3. For example, the process shown in this flowchart is started when the controller 40 is powered on, and repeated in a predetermined cycle. Note that the process shown in this flowchart may be started when the controller 40 determines that the subject vehicle 101 is located within a predetermined range from the merge point, on the basis of the target route calculated by the navigation device 36 and the subject vehicle position recognized by the subject vehicle position recognition unit 43.

First, in S11 (S: process step), the controller 40 determines whether a merge traffic light has been recognized in the travel direction of the subject vehicle 101. More specifically, the controller 40 determines that it has received change schedule information of the traffic lights SG1 and SG2 transmitted from a roadside unit (not shown) through the communication unit 37 using road-to-vehicle communication (V2I communication) or the like. Step S11 is repeated until the determination becomes YES.

If the determination in S11 is YES, the controller 40, in S12, determines whether the merge lane on which the subject vehicle 101 is traveling is a merge lane more remote from the main line. Here, it is assumed that two merge lanes, a first merge lane closer to the main line (also referred to as the "inner merge lane") and a second merge lane more remote from the main line (also referred to as the "outer merge lane"), merge with the main line, as shown in FIG. 3. If the determination in S12 is NO, the controller 40, in S18, determines the first merge lane as the merge lane on which the subject vehicle 101 should travel. In this case, the subject vehicle 101 continuously travels on the first merge lane and enters the main line.

If the determination in S12 is YES, the controller 40, in S13, determines whether a merge traffic light corresponding to the outer merge lane on which the subject vehicle 101 is traveling is showing a green signal. This step is performed when the subject vehicle 101 reaches a position a predetermined distance before the stop line of the merge traffic light (e.g., the position P2 shown in FIG. 2A). Hereafter, a merge traffic light corresponding to the inner merge lane (first merge lane) may be referred to as the "first merge traffic light," and a merge traffic light corresponding to the outer merge lane (second merge lane) as the "second merge traffic light."

If the determination in S13 is YES, the controller 40, in S14, determines whether the time left before the first merge traffic light changes to a green signal, that is, the remaining time of the red signal is equal to or less than the predetermined time TM. If the determination in S14 is YES, the controller 40, in S16, determines the first merge lane as the merge lane on which the subject vehicle 101 should travel. In this case, the subject vehicle 101 changes the lane from the second merge lane to the first merge lane and then enters the main line. If the determination in S14 is NO, the controller 40, in S17, determines the second merge lane as the merge lane on which the subject vehicle 101 should travel. In this case, the subject vehicle 101 does not change the lane but rather continuously travels on the second merge lane and then enters the main line.

If the determination in S13 is NO, the controller 40, in S15, determines whether the time left before the first merge traffic light changes to a red signal, that is, the remaining time of the green signal is equal to or more than the predetermined time TM. If the determination in S15 is NO, the process proceeds to S17. If the determination in S15 is YES, the process proceeds to S18. S18 is similar to S16.

Then, S19, the controller 40 generates the target path of the subject vehicle 101 leading to the stop line of the first merge traffic light or the stop line of the second merge traffic light. More specifically, if the first merge lane is determined as the merge lane on which the subject vehicle 101 should travel in S16 or S18, the controller 40 generates the target path of the subject vehicle 101 leading to the first merge traffic light. On the other hand, if the second merge lane is determined as the merge lane on which the subject vehicle 101 should travel in S17, the controller 40 generates the target path of the subject vehicle 101 leading to the second merge traffic light.

Figure 5A:
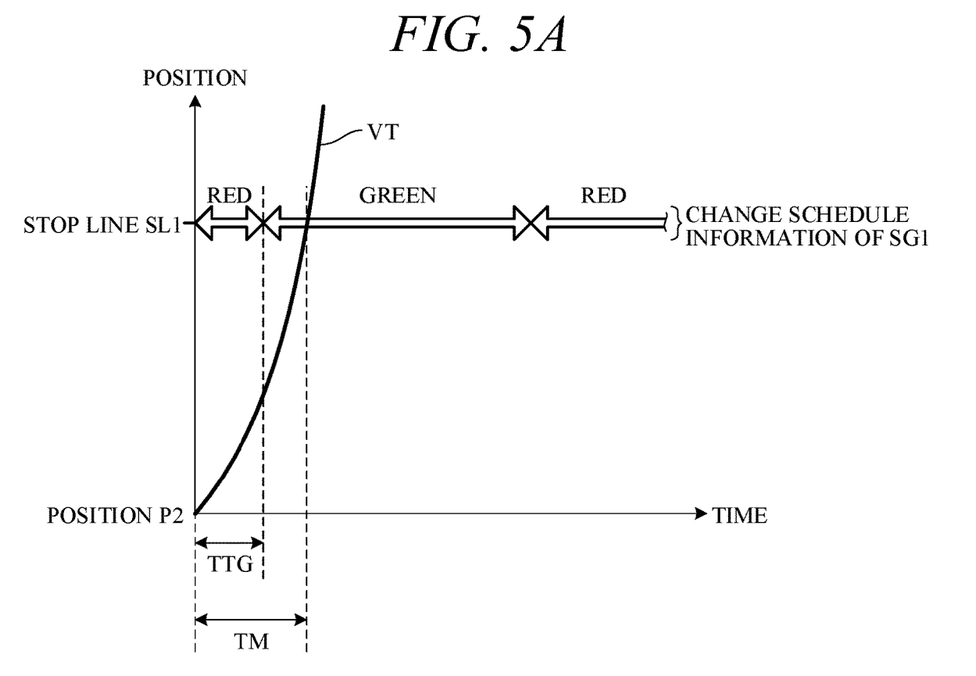
FIG. 5A is a diagram showing an example of a temporal change in a position of a vehicle and an indication form of a merge traffic light.

The operation of the travel control apparatus 200 according to the present embodiment is summarized as follows. When the subject vehicle 101 traveling on the merge lane RL2 reaches the position P2 and meets the traffic light SG2 showing a green signal, the controller 40 determines whether the remaining time of the red signal of the traffic light SG1 of the adjacent merge lane RL1, that is, the time TTG left before the traffic light SG1 changes to a green signal is equal to or less than the predetermined time TM (S13→S14). If the time TTG from the current time point until the traffic light SG1 changes to a green signal is equal to or less than the predetermined time TM, as shown in FIG. 5A, the controller 40 determines the merge lane RL1 as the merge lane on which the subject vehicle 101 should travel (S14→S16) and generates the target path leading to the stop line SL1 of the merge lane RL1. A characteristic VT in FIG. 5A represents the relationship between the position of the subject vehicle 101 and the time obtained from the target path of the subject vehicle 101.

Figure 5B:
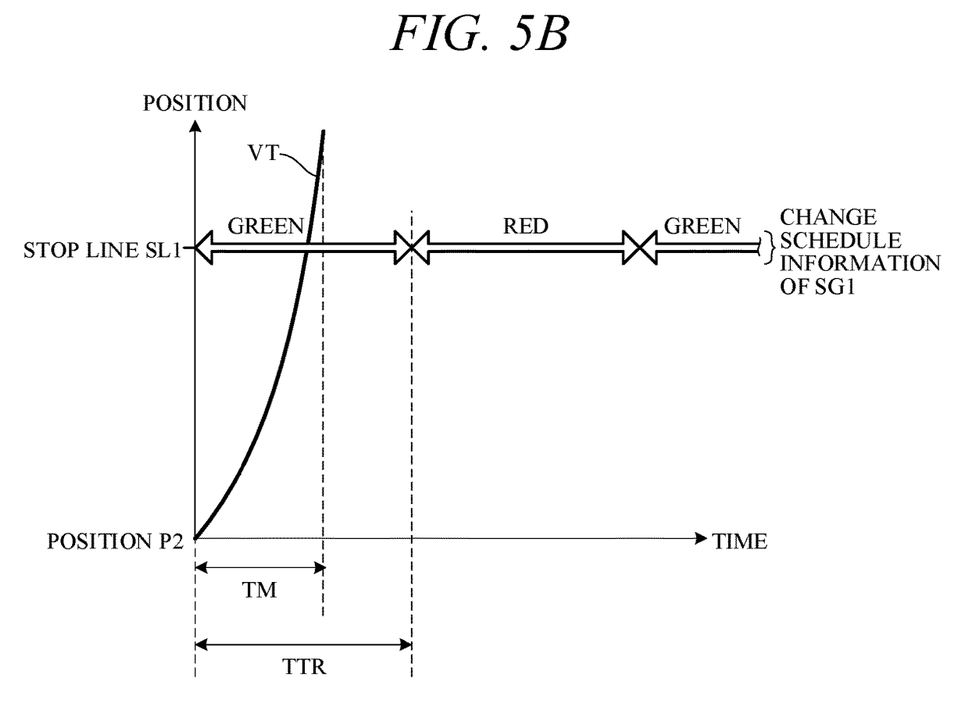
FIG. 5B is a diagram showing another example of a temporal change in a position of a vehicle and an indication form of a merge traffic light.

On the other hand, when the subject vehicle 101 traveling on the merge lane RL2 reaches the position P2 and meets the traffic light SG2 showing a red signal, the controller 40 determines whether the remaining time of the green signal of the traffic light SG1 of the adjacent merge lane RL1, that is, the time TTR left before the traffic light SG1 changes to a red signal is equal to or more than the predetermined time TM (S13→S15). If the time TTR left before the traffic light SG1 changes to a red signal is equal to or more than the predetermined time TM, as shown in FIG. 5B, the controller 40 determines the merge lane RL1 as the merge lane on which the subject vehicle 101 should travel (S15→S18) and generates the target path leading to the stop line SL1 of the merge lane RL1.

The travel control apparatus 200 according to the embodiment of the present invention produces the following advantageous effects.

(1) The travel control apparatus 200 that controls the travel of the subject vehicle 101 includes the acquisition unit 411 that acquires the change schedule information (information on the change scheduled) of the traffic lights installed over the multiple merge lanes RL1 and RL2 that merge with the main line ML and configured to be able to change the indication form between the first indication form permitting vehicles to enter the main line ML and the second indication form instructing vehicles to stop before the stop line SL1 or SL2, the determination unit 412 that determines one of the merge lanes RL1 and RL2 as the merge lane on which the subject vehicle 101 should travel, on the basis of the change schedule information of the traffic lights SG1 and SG2 located in the travel direction of the subject vehicle 101 acquired by the acquisition unit 411, and the path generation unit 413 that generates the target path of the subject vehicle 101 leading to the stop line (stop line SL1 or stop line SL2) of the merge lane determined by the determination unit 412. Thus, the travel control apparatus 200 is able to cause the subject vehicle to smoothly enter the main line at the merge point at which the multiple merge lanes merge with the main line, in accordance with the timing at which the indication of the merge traffic light is changed.

(2) When the subject vehicle 101 traveling on the merge lane RL2, which is one of the multiple merge lanes RL1 and RL2 and is more remote from the main line ML than the first merge lane, reaches the position P2 the predetermined distance before the stop line SL2 of the merge lane RL2, the determination unit 412 determines the merge lane RL1 or merge lane RL2 as the merge lane on which the subject vehicle 101 should travel, on the basis of change schedule information acquired by the acquisition unit 411. Thus, the travel control apparatus 200 is able to make shorter the path along which the subject vehicle travels before entering the main line and thus to cause the subject vehicle to enter the main line earlier.

(3) If the determination unit 412 recognizes that the traffic light SG2 of the merge lane RL2 is taking the second indication form and that the time left before the traffic light SG1 of the merge lane RL1 is changed to the second indication form is equal to or more than the predetermined time TM, on the basis of change schedule information acquired by the acquisition unit 411, it determines the merge lane RL1 as the merge lane on which the subject vehicle 101 should travel. Further, if the determination unit 412 recognizes that the traffic light SG2 of the merge lane RL2 is taking the first indication form and that the time left before the traffic light SG1 of the merge lane RL1 is changed to the first indication form is equal to or less than the predetermined time TM, on the basis of change schedule information acquired by the acquisition unit 411, it determines the merge lane RL1 as the merge lane on which the subject vehicle 101 should travel. As seen above, the travel control apparatus 200 causes the subject vehicle 101 to change the lane from the merge lane RL2 to the merge lane RL1 so that the subject vehicle 101 does not stop at the stop line SL1 or SL2, on the basis of the time during which the traffic light SG1 of the merge lane RL1 will take the first indication form (e.g., a green signal). Thus, the travel control apparatus 200 is able to cause the subject vehicle to smoothly enter the main line along a shorter travel path.

(4) Assuming that lane change is prohibited in the section from the stop line SL2 of the merge lane RL2 to the position P1 a first predetermined distance before the stop line SL2, when the subject vehicle 101 reaches the position P2 a second predetermined distance, which is longer than the first predetermined distance, before the stop line SL2 of the merge lane RL2, the determination unit 412 determines the merge lane RL1 or merge lane RL2 as the merge lane on which the subject vehicle 101 should travel, on the basis of change schedule information acquired by the acquisition unit 411. Thus, the travel control apparatus 200 is able to cause the subject vehicle to smoothly enter the main line along a shorter travel path even at the merge point provided with the lane change prohibiting section.

(5) The travel control apparatus 200 also includes the vehicle recognition unit 414 that recognizes other vehicles around the subject vehicle, including an adjacent vehicle traveling on the merge lane adjacent to the merge lane on which the subject vehicle 101 is traveling and the acceleration/deceleration control unit 415 that when the vehicle recognition unit 414 recognizes an adjacent vehicle in the period from when the subject vehicle 101 passes the stop line SL1 or SL2 until it reaches the main line ML, controls the acceleration or deceleration of the subject vehicle 101 on the basis of the relative distance or relative speed between the subject vehicle 101 and adjacent vehicle. Thus, the travel control apparatus 200 is able to avoid the subject vehicle 101 from entering the main line ML while traveling in parallel with the adjacent vehicle after passing the stop line SL1 or SL2.

In the above description of the embodiment, there have been used, as am example, the traffic lights configured to be able to change the indication form between a green signal permitting vehicles to travel and a red signal instructing vehicles to stop at a stop line. However, the travel control apparatus 200 according to the present embodiment is able to perform stop control of the subject vehicle 101 also when the subject vehicle 101 passes a point at which traffic lights taking other indication forms are installed. For example, the traffic lights SG1 and SG2 may be traffic lights configured to be able to change the indication form among a green signal permitting vehicles to travel, a red signal instructing vehicles to stop at a stop line, and a yellow light notifying vehicles of change from a green signal to a red signal beforehand.

In the above embodiment, when the subject vehicle 101 traveling on the merge lane RL2 reaches the position P2 the predetermined distance before the stop line SL2 of the merge lane RL2, the determination unit 412 determines the merge lane on which the subject vehicle 101 should travel on the basis of change schedule information acquired by the acquisition unit 411; however, the determination unit need not have this configuration. The determination unit may predict the time point at which the subject vehicle 101 will reach the position P2, on the basis of the current location, travel speed, and travel acceleration of the subject vehicle 101 and predict the indication forms of the traffic light SG1 of the merge lane RL1 and the traffic light SG2 of the merge lane RL2 at the time point at which the subject vehicle 101 will reach the position P2, on the basis of change schedule information acquired by the acquisition unit 411. Also, when the subject vehicle 101 is located in a section a predetermined distance before the stop line SL2 of the merge lane RL2, for example, in a section from the position P1 to the position P2, the determination unit may determine the merge lane on which the subject vehicle 101 should travel, on the basis of change schedule information acquired by the acquisition unit 411.

Also, when the subject vehicle 101 traveling on the merge lane RL1 closer to the main line ML reaches a position a predetermined distance before the stop line SL1 of the merge lane RL1, the determination unit may determine the merge lane on which the subject vehicle 101 should travel. For example, when the traffic light SG1 of the merge lane RL1 is showing a green signal, the determination unit determines the merge lane RL1 as the merge lane on which the subject vehicle 101 should travel, regardless of the length of the remaining time of the red signal of the merge lane RL2. Also, when the traffic light SG1 of the merge lane RL1 is showing a red signal and when the remaining time of the green signal of the merge lane RL2 is equal to or more than a predetermined time, the determination unit determines the merge lane RL2 as the merge lane on which the subject vehicle 101 should travel and generates the target path leading to the stop line SL2 of the merge lane RL2. At this time, the travel path of the subject vehicle 101 becomes longer by changing the lane to the merge lane RL2; however, the travel control apparatus 200 is able to cause the subject vehicle 101 to enter the main line ML earlier.

While, in the above embodiment, the acquisition unit 411 acquires the change schedule information of the traffic lights SG1 and SG2 on the basis of data on images of the traffic lights SG1 and SG2 captured by the camera 11, an acquisition unit need not have this configuration and may acquire the change schedule information of the traffic lights SG1 and SG2 on the basis of data on images of a vehicle ahead of the subject vehicle 101 captured by the camera 11. For example, when a vehicle is present ahead of the subject vehicle 101 in the travel direction, the traffic lights SG1 and SG2 may be hidden behind the vehicle ahead and thus the acquisition unit may not be able to recognize the indication forms or the like of the traffic lights SG1 and SG2 on the basis of data on images captured by the camera 11. In such a case, the acquisition unit may recognize the indication forms or the like of the traffic lights SG1 and SG2 on the basis of data on images (moving image data) of the vehicle ahead captured by the camera 11. Specifically, the acquisition unit may recognize the timings at which the vehicle ahead stops and starts near the stop line SL1 or SL2 and then recognize the current indication forms or indication form change timings of the traffic lights SG1 and SG2 on the basis of the recognized timings at which the vehicle ahead stops and starts.

For example, when the vehicle ahead is stopping at the stop line, the acquisition unit is able to recognize that the merge traffic light is currently showing a red signal. Also, when the vehicle ahead stopping at the stop line starts, the acquisition unit is able to recognize that the merge traffic light has changed the indication form from the red signal to a green signal. Also, when the vehicle ahead passes the stop line without stopping at the stop line, the acquisition unit is able to recognize that the merge traffic light is showing a green signal. Also, when the traveling vehicle ahead stops at the stop line, the acquisition unit is able to recognize that the merge traffic light has changed the indication form from the green signal to a red signal. Also, the acquisition unit is able to recognize the indication form change timing of the merge traffic light on the basis of the time from when the vehicle ahead stops at the stop line until the vehicle ahead starts. Also, if multiple vehicles are present ahead of the subject vehicle 101, the acquisition unit is able to recognize the indication form change timing of the merge traffic light on the basis of the time from when a vehicle ahead stopping at the stop line starts until a vehicle immediately behind the vehicle ahead stops. Thus, even if the traffic lights SG1 and SG2 cannot be recognized from images captured by the camera 11 due to occlusion by the vehicle ahead, the acquisition unit is able to recognize the indication forms or indication form change timings of the traffic lights SG1 and SG2.

While, in the above embodiment, there has been described, as an example, travel control performed when the subject vehicle 101 travels through the merge point MP at which the two merge lanes RL1 and RL2 merge with the main line, the travel control apparatus 200 is able to perform similar travel control also when the subject vehicle travels through a merge point at which three or more merge lanes merge with the main line and thus to cause the subject vehicle to smoothly enter the main line.

While, in the above embodiment, the travel control apparatus 200 is applied to the autonomous driving vehicle, the travel control apparatus 200 can also be applied to vehicles other than autonomous driving vehicles. For example, the travel control apparatus 200 can also be applied to manual driving vehicles including advanced driver-assistance systems (ADAS). In this case, the travel control apparatus 200 only has to include at least the acquisition unit 411 and determination unit 412. When the determination unit 412 determines the merge lane on which the subject vehicle 101 should travel among the multiple merge lanes, it displays information indicating the determined merge lane on the display unit of the input/output device 33. If the determined merge lane differs from the merge lane on which the subject vehicle 101 is currently traveling, the determination unit 412 may display information urging the driver to change the lane to the determined merge lane on the display unit of the input/output device 33. The driver of the subject vehicle 101 is able to cause the subject vehicle 101 to smoothly enter the main line by performing a driving operation in accordance with the information displayed on the display unit. The determination unit 412 also may output speech information indicating the determined merge lane or speech information urging the driver to change the lane to the determined merge lane to the speaker of the input/output device 33.

The above embodiment can be combined as desired with one or more of the above modifications. The modifications can also be combined with one another.

The present invention is able to cause the subject vehicle to smoothly move from the merge lane into the main line at the point at which the multiple merge lanes merge with the main line.

Above, while the present invention has been described with reference to the preferred embodiments thereof, it will be understood, by those skilled in the art, that various changes and modifications may be made thereto without departing from the scope of the appended claims.

What is claimed is:

1. A travel control apparatus configured to control a travel of a vehicle so as to travel along a target path, comprising
an electronic control unit including a microprocessor and a memory connected to the microprocessor, wherein
the microprocessor is configured to perform:
acquiring change schedule information of a traffic light installed over each of a plurality of merge lanes that merge with a main line and configured to be able to change an indication form between a first indication form permitting the vehicle to merge with the main line and a second indication form instructing the vehicle to stop before a stop line;
determining a merge lane on which the vehicle travels among the plurality of merge lanes, based on the change schedule information of a traffic light located in a travel direction of the vehicle; and
generating a target path of the vehicle leading to the stop line of the merge lane, and wherein
the microprocessor is configured to perform
the determining including determining, when the vehicle reaches a position a first predetermined distance before the stop line of a second merge lane, while traveling on the second merge lane among the plurality of merge lanes which is more remote from the main line than a first merge lane, the first merge lane or the second merge lane as the merge lane on which the vehicle travels based on the change schedule information.

2. The travel control apparatus according to claim 1, wherein
the microprocessor is configured to perform
the determining including determining, when recognizing that the traffic light of the second merge lane takes the second indication form and that a time left before the traffic light of the first merge lane is changed to the second indication form is equal to or more than a predetermined time based on the change schedule information, the first merge lane as the merge lane on which the vehicle travels.

3. The travel control apparatus according to claim 1, wherein
the microprocessor is configured to perform
the determining including determining, when recognizing that the traffic light of the second merge lane takes the first indication form and that a time left before the traffic light of the first merge lane is changed to the first indication form is equal to or less than a predetermined time based on the change schedule information, the first merge lane as the merge lane on which the vehicle travels.

4. The travel control apparatus according to claim 1, wherein
the microprocessor is configured to perform
the determining including determining, when the vehicle reaches a position a second predetermined distance longer than the first predetermined distance before the stop line of the second merge lane if a lane change is prohibited in a section from the stop line of the second merge lane to a position the first predetermined distance before the stop line of the second merge lane, the first merge lane or the second merge lane as the merge lane on which the vehicle travels, based on the change schedule information, and the second predetermined distance longer than the first predetermined distance.

5. The travel control apparatus according to claim 1, wherein
the microprocessor is configured to further perform
recognizing another vehicle around the vehicle, including an adjacent vehicle traveling on the merge lane adjacent to the merge lane on which the vehicle travels; and
controlling, when recognizing the adjacent vehicle in a period from when the vehicle passes the stop line until the vehicle reaches the main line, acceleration or deceleration of the vehicle based on a relative distance or relative speed between the vehicle and the adjacent vehicle.

6. A travel control method of a travel control apparatus configured to control a travel of a vehicle so as to travel along a target path, the travel control method comprising:
acquiring change schedule information of a traffic light installed over each of a plurality of merge lanes that merge with a main line and configured to be able to change an indication form between a first indication form permitting the vehicle to merge with the main line and a second indication form instructing the vehicle to stop before a stop line;
determining a merge lane on which the vehicle travels among the plurality of merge lanes, based on the change schedule information of the traffic light located in a travel direction of the vehicle; and
generating a target path of the vehicle leading to the stop line of the merge lane, wherein
the determining includes determining, when the vehicle reaches a position a predetermined distance before the stop line of a second merge lane, while traveling on the second merge lane among the plurality of merge lanes which is more remote from the main line than a first merge lane, the first merge lane or the second merge lane as the merge lane on which the vehicle travels based on the change schedule information.

7. A travel control apparatus configured to control a travel of a vehicle so as to travel along a target path, comprising
an electronic control unit including a microprocessor and a memory connected to the microprocessor, wherein
the microprocessor is configured to perform
acquiring change schedule information of a traffic light installed over each of a plurality of merge lanes that merge with a main line and configured to be able to change an indication form between a first indication form permitting the vehicle to merge with the main line and a second indication form instructing the vehicle to stop before a stop line;
determining a merge lane on which the vehicle travels among the plurality of merge lanes, based on the change schedule information of the traffic light located in a travel direction of the vehicle; and
generating a target path of the vehicle leading to the stop line of the merge lane, and wherein
the microprocessor is configured to further perform
recognizing another vehicle around the vehicle, including an adjacent vehicle traveling on the merge lane adjacent to the merge lane on which the vehicle travels; and
controlling, when recognizing the adjacent vehicle in a period from when the vehicle passes the stop line until the vehicle reaches the main line, acceleration or deceleration of the vehicle based on a relative distance or relative speed between the vehicle and the adjacent vehicle.

* * * * *